US008474159B2

(12) United States Patent
Molino (10) Patent No.: US 8,474,159 B2
(45) Date of Patent: Jul. 2, 2013

(54) LAND CLEARING DEVICE

(76) Inventor: Vincent A. Molino, Harahan, LA (US)

( * ) Notice: Subject to any disclaimer, the term of this patent is extended or adjusted under 35 U.S.C. 154(b) by 487 days.

(21) Appl. No.: 12/799,772

(22) Filed: Apr. 30, 2010

(65) Prior Publication Data

US 2010/0219387 A1 Sep. 2, 2010

Related U.S. Application Data (63) Continuation-in-part of application No. 12/590,127, filed on Nov. 3, 2009, now Pat. No. 8,033,526.

(60) Provisional application No. 61/193,215, filed on Nov. 6, 2008.

(51) Int. Cl.
*A01B 13/00* (2006.01)

(52) U.S. Cl.
USPC .............. 37/301; 254/120; 254/131; 254/132

(58) Field of Classification Search
USPC .............................. 37/301; 254/120, 131, 132
See application file for complete search history.

(56) References Cited

U.S. PATENT DOCUMENTS

| 3,823,916 | A | * | 7/1974 | Shaw | 254/132 |
| 4,445,557 | A | * | 5/1984 | Peters, III | 144/336 |
| 7,066,449 | B1 | * | 6/2006 | Trefan et al. | 254/124 |
| 8,033,526 | B2 | * | 10/2011 | Molino | 254/132 |
| 2009/0095375 | A1 | | 4/2009 | Little et al. | |

* cited by examiner

*Primary Examiner* — Lee D Wilson
*Assistant Examiner* — Shantese McDonald
(74) *Attorney, Agent, or Firm* — Keaty Law Firm (57) ABSTRACT

A land-clearing implement configured to be attached to a small earth-moving machine, such as a skid loader. The land-clearing device has a pusher assembly with telescopically extendable actuator arms that are operated by a hydraulic auxiliary source accessible from the interior of the earthmoving machine. When the actuator arms are extended, the forward end of the pusher assembly applies a pushing force on the trunk of a tree, pushing the tree until uprooted. The pusher assembly is supported by a mounting bracket that rests on the ground and provides stability to the pusher assembly. A pair of opposing grabber arms with C-shaped hooks is secured to the pusher assembly by pivoting securing rods. The grabber arms partially encircle and the C-shaped hooks dig into the root ball of the tree to provide stability as the pusher assembly is engaged.

14 Claims, 6 Drawing Sheets

LAND CLEARING DEVICE

CROSS-REFERENCE TO RELATED APPLICATIONS

This application is a continuation-in-part of my application Ser. No. 12/590,127 filed on Nov. 3, 2009, now U.S. Pat. No. 8,033,526, which is a non-provisional application based on my provisional application No. 61/193,215 filed on Nov. 6, 2008, entitled "Land Clearing Device," the full disclosures of which are incorporated by reference herein, and priority of which is hereby claimed.

BACKGROUND OF THE INVENTION

The present invention relates to tree and stump removal, and more particularly to a land clearing device used as an attachment for a skid steer loader or other earthmoving machine that can be used for removing trees and stumps.

It is expensive to use bulldozers and excavators to clear land for new construction of homes or for removal of unwanted trees and stumps. It also requires a tremendous force to remove the trees and uproot the stumps. Usually, it is hoped to spare neighboring trees due to beauty and the expense to replace them. Currently, building contractors and professionals have to use large, expensive, heavy-duty bulldozers and excavators. The large machinery currently in use has frequently knocked down many neighboring trees that could have been saved. In addition, the large heavy-duty bulldozers have a high cost of fuel for operation as well as transportation, which means these machines have a large carbon footprint. Furthermore, there are swampy areas that require removal of trees and stumps, but this heavy-duty equipment sinks in the mud, causing further damage and expense. Lastly, stump removal by a large excavator or stump grinders often leaves behind a hole that has to be filled in by the landowner. Therefore, a land-clearing device to solve the aforementioned problems is desired.

SUMMARY OF THE INVENTION

It is therefore an object of the present invention to provide a tree-felling device that can be secured to a small earth-moving machine.

It is another object of the invention to provide a tree felling attachment to an earth-moving machine that reduces the force to uproot a tree.

Those and other objects of the invention are achieved through a provision of a land-clearing device that is sized and configured to be attached to a small earth-moving machine.

The land clearing devise comprises a pusher having telescopically extendable actuator arms and a forward V-shaped contact member configured to apply a pushing force to a trunk of a tree. The main components are connected by three rods that extend through the frame, the pusher assembly, the grabbers, and the universal mount which facilitates the movement of the land clearing device and transfers force form the actuators to the grabber arms.

The grabber assembly is mounted below the pusher assembly. The grabber assembly comprises two arms with C-shaped hooks configured to partially encircle and dig into the lower trunk of the tree and support the tree at a location opposite a place of contact of the pusher assembly.

A control unit is provided for operating the pusher assembly and the grabber arms from the interior of the earthmoving machine. The control unit is a hydraulic control unit, and the actuator arms are hydraulic-operated pistons. The pusher assembly comprises a pair of actuator arms, which are hydraulically powered cylinders. In addition, movement of the grabber arms is facilitated via hydraulic control.

These and other features of the present invention will become readily apparent upon further review of the following specifications and drawings.

BRIEF DESCRIPTION OF THE DRAWINGS

Reference will now be made to the drawings, wherein like parts are designated by like numerals, and wherein.

Similar referenced characters denote corresponding features consistently throughout the attached drawings.

DETAIL DESCRIPTION OF THE INVENTION

As shown in FIGS. 1-6, the land clearing device 100 is sized and configured to be attached to a small earth-moving machine, for instance a skid steer loader 120 or other similar equipment. Such earthmoving machines, including the skid loaders, are currently manufactured by Caterpillar, Bobcat, New Holland, Posi-Trac, Case, JCR, Scat-Trac, Kubota, Gehl, John Deere and other companies. In fact, these machines have become very popular in the past ten years, and many contractors currently own either multi-terrain or loader, such as the machine 120. Such machines are also available for rental.

Figure 1:
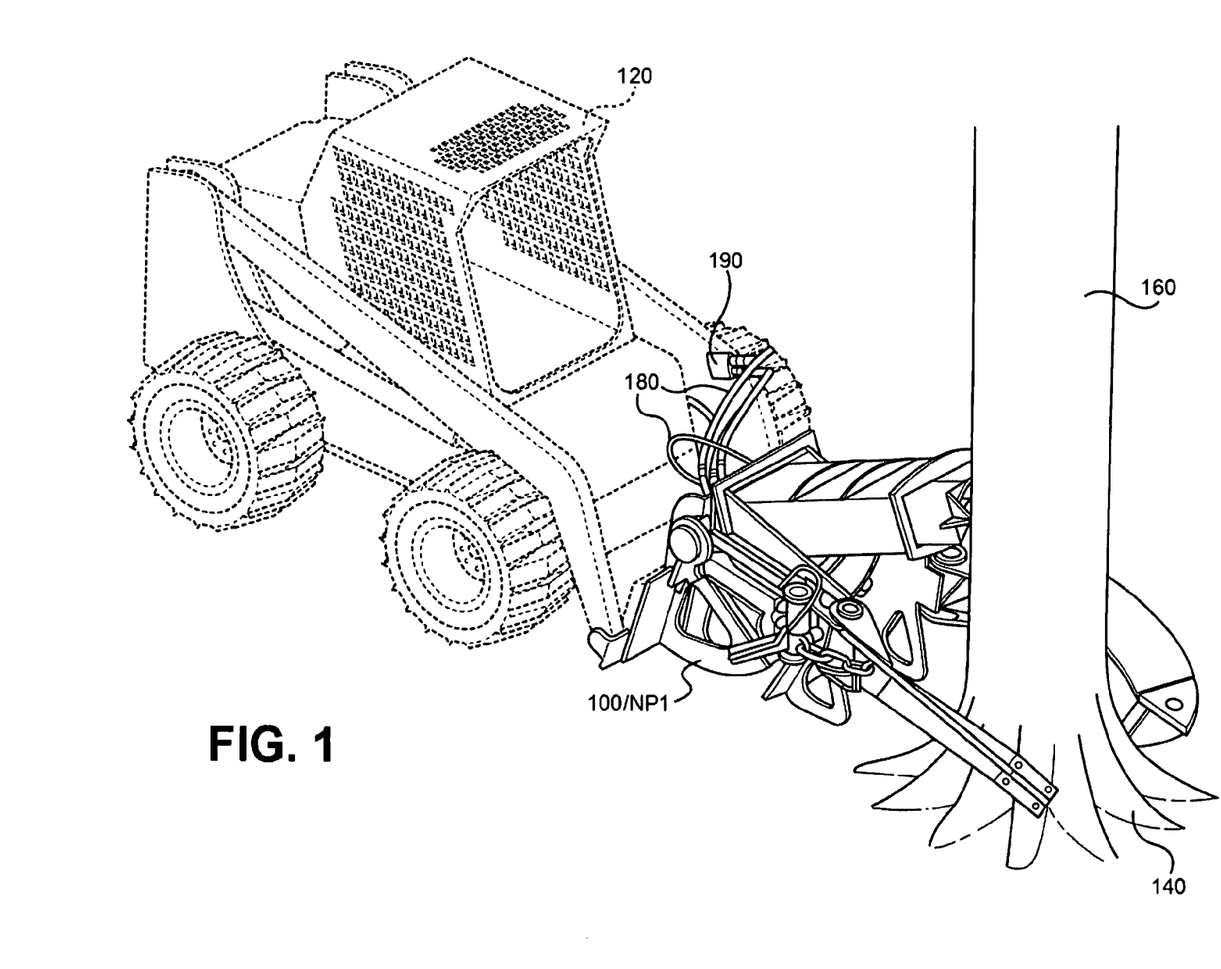
FIG. 1 is a perspective view of a land-clearing device according to the present invention attached to a skid steer loader.

The land-clearing device 100 comprises a pusher assembly 200, a grabber assembly, and a universal mount assembly 400. The mount assembly 400 is sized and configured for attachment to a variety of skid loaders, front loaders and the like. The grabber assembly comprises a pair of arcuate opposing grabber arms 300A and 300B. As shown in FIG. 1, the machine or loader 120 with the land-clearing device 100 is positioned near a lower portion 140 of a tree, generally indicated with the number 160. The pusher assembly 200 and the grabber arms 300A and 300B make contact with the tree 160 at a location adjacent the lower portion 140. The universal mount assembly 400 provides a means for securing the land-clearing device 100 to the earthmoving machine 120.

A pivot rod 500 extends through each of the three major components of the land-clearing device 100 and facilitates the movement of the pusher assembly 200 as well as the mount assembly 400. Additionally, hydraulic hoses 180 connect the operating parts of the land-clearing device 100 to an auxiliary hydraulic source 190 of the machine or loader 120. A control unit 191 accessible from interior cab of the loader 120 allows control of the device 100 from the interior of the loader 120.

Figure 2:
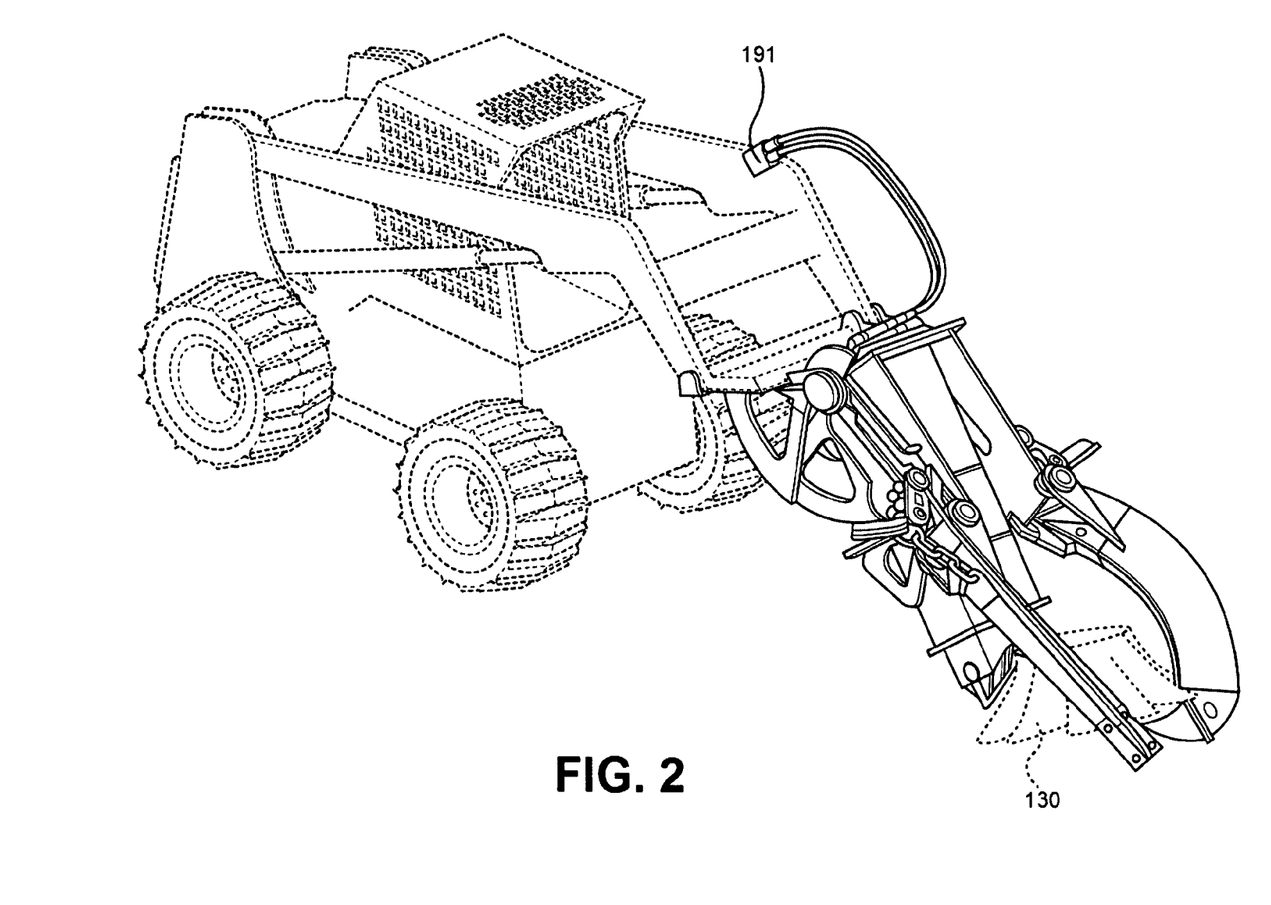
FIG. 2 is a perspective view of a land-clearing device of the present invention engaging a stump of a tree according to the present invention.

FIG. 2 is a perspective view of the land-clearing device engaging a stump 130 of the tree 100. The land-clearing device 100 attached to a machine or loader 120 can facilitate stump removal by positioning the grabber arms 300A and 300B near the root ball.

Figure 3:
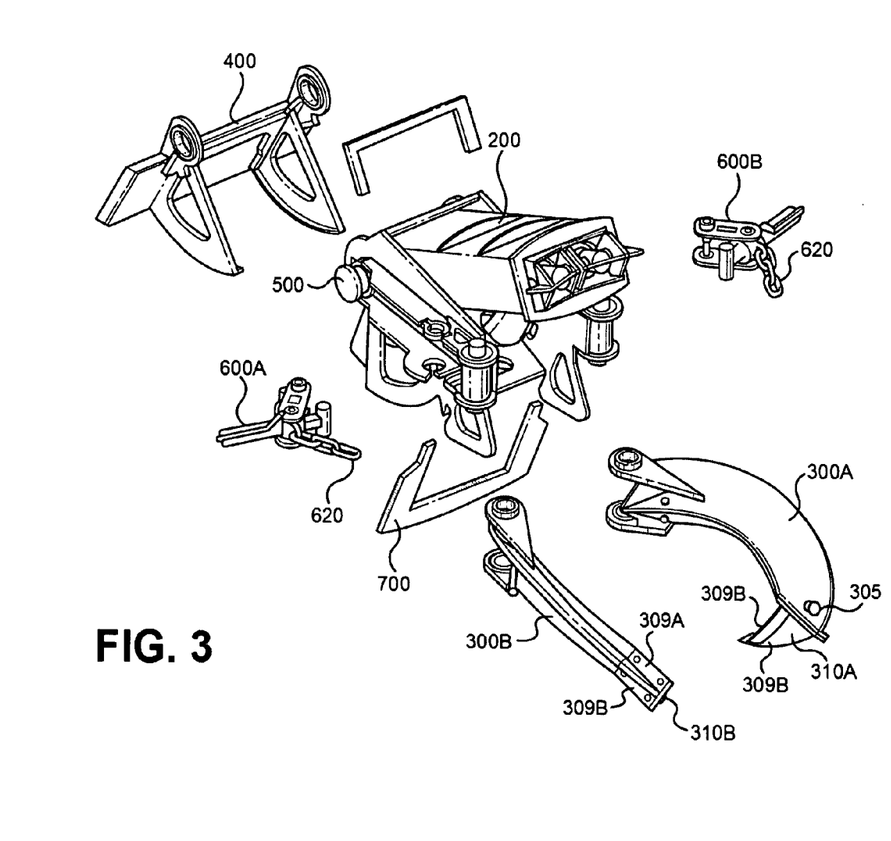
FIG. 3 is an exploded view of the main parts of the land-clearing device according to the present invention.

FIG. 3 is an exploded view of the main parts of the land-clearing device 100. The pusher assembly 200 anchors to the universal mount assembly 400 by the pivot rod 500. The pusher assembly 200 is further secured to a U-shaped support bracket 700, which is configured to rest on the ground and support the pusher assembly 200 in a cantilevered position from the mounting assembly 400 (see, FIG. 5).

Figure 5:
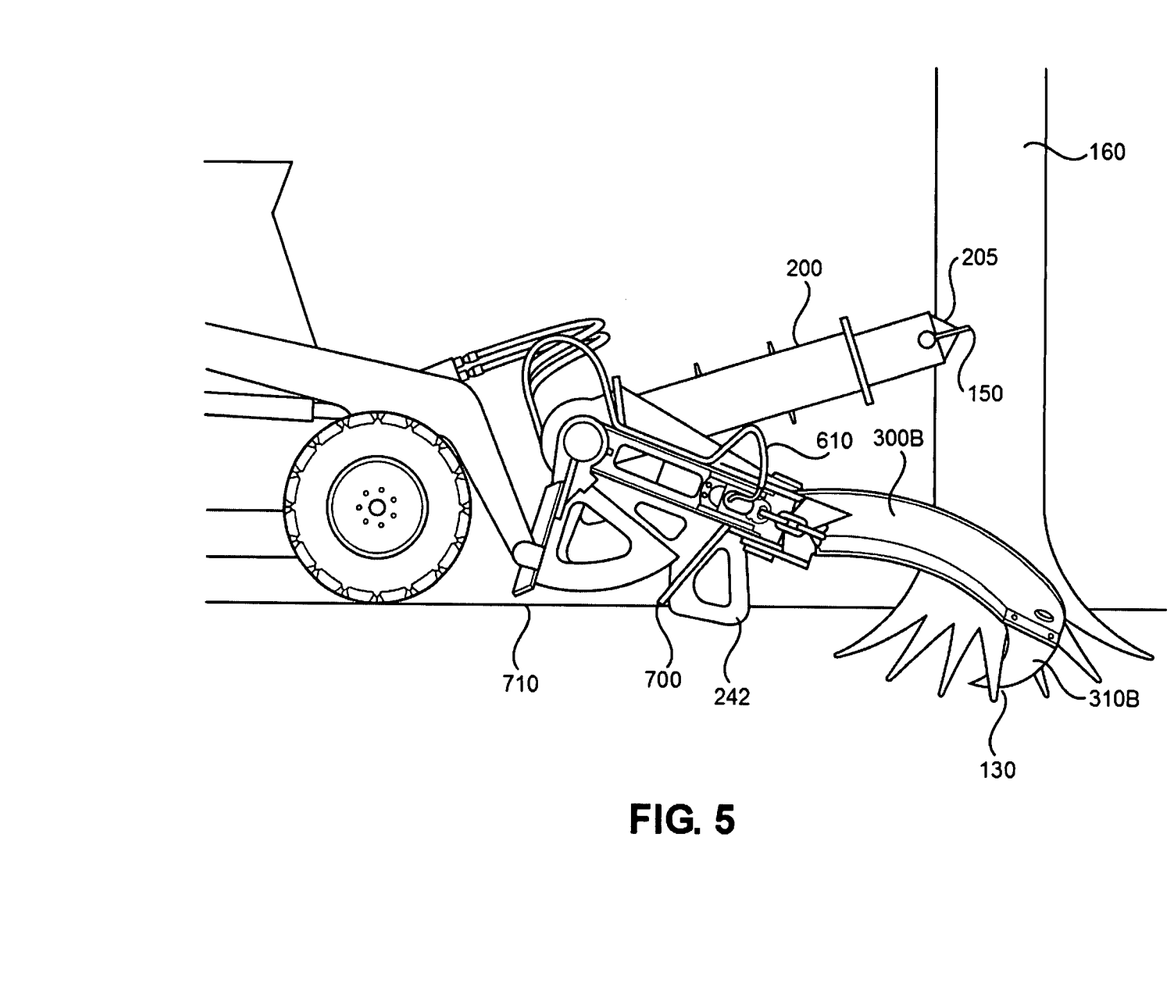
FIG. 5 is a side view of the land-clearing device illustrating a unique manner, in which the grabber arms of the land-clearing device securely anchor into a root ball.

The grabber arms 300A and 300B are operationally connected to the pusher assembly 200 by hydraulic side cylinders 600A and 600B respectively which are configured to retract and move grabber arms 300A and 300B between a transport position to an operation position engaging the tree 160. A hydraulic hose 610 (only one is shown in FIG. 5) feeds each of the hydraulic side cylinders 600A and 600B. The hydraulic side cylinders 600A and 600B are attached to the grabber arms 300A and 300B respectively by a link 620, which can be a chain or a solid rod.

The grabber arms 300A and 300B each have two C-shaped hooks 310A and 310B respectively. Each of the two C-shaped hooks 310A and 310B is formed of two parallel plates 309A and 309B that are secured together to reinforce the hooks 310A and 310B and allow the hooks 310A, 310B to withstand considerable loads when engaging a tree trunk or a root ball of a tree.

Figure 4:
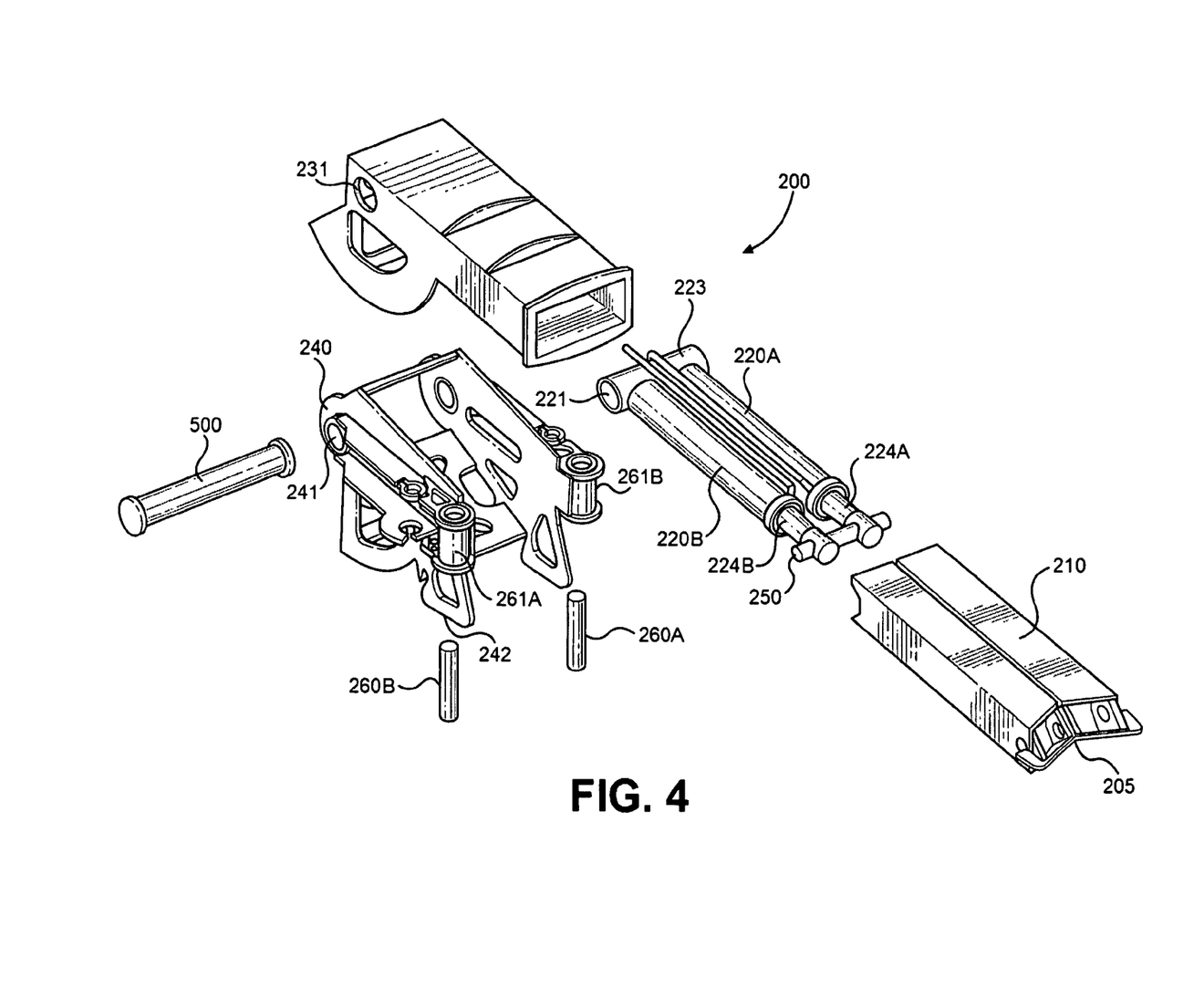
FIG. 4 is an exploded view of the pusher assembly of the land-clearing device according to the present invention.

FIG. 4 is an exploded view of the pusher assembly 200 for the land-clearing device 100 according to the present invention. The pusher assembly is mostly made of tubular steel and flat bar to minimize cost. The pusher assembly 200 comprises a distal or forward portion 210, telescopically extendable actuator arms 220A and 220B, and a proximate or rear portion 230. The forward portion 210 comprises a generally V-shaped contact member 205 configured to contact the tree 160 and transmit a pushing force on the tree trunk.

The actuator arms 220A and 220B are hydraulically powered cylinders with telescopically movable actuator rods 224A and 224B, respectively, which are anchored together by a cross pin 250. The rods with the cross pin 250 are configured to move within the actuator arms 220A and 220B in response to a signal sent by the operator to the auxiliary hydraulic source 190 from the cabin of the loader 120. The actuator arms 220A and 220B are sized to fit within the forward portion 210. In this manner, pushing force is transmitted from the hydraulic power source to the forward portion 210.

The hollow proximate or rear portion 230 forms the casing for the forward portion 210 and the actuator arms 220A and 220B. The rear portion 230 and the actuator arms 200A and 200 B and held in place on a cradle 240 by the pivot rod 500 which extends through aligned openings 231 of the rear portion 230, openings 241 of the cradle 240, and openings 221 formed in a cross member 223 that connects the actuator arms 220A and 220B. The grabber arms 300A and 300B are pivotally attached to the pusher assembly 200 and the cradle 249 by securing rods 260A and 260B engageable within receiving members 261A and 261B.

FIG. 5 illustrates engagement of a root ball 130 by the hooks 310A and 310B. In that position, the support bracket 700 rests on the ground 710. A forward part 242 of the cradle 240 also rests on the ground 710 in a position forward of the support bracket 700. The pusher assembly 200 is elevated above the grabber assembly and extended forward so that the forward part with its contact member 205 transfers the pushing force from the hydraulic actuator arms 220A and 220B to the tree 160 at a point 150. As the pushing force is applied the grabber arms 300A and 300B resist the forward-directed force firmly engaging the root 130 with the hooks 310A and 310B. It is envisioned that in some cases, it may become necessary to first make one or more cuts in the trunk 160 to allow the pusher assembly to snap the trunk of the tree.

Figure 6A:
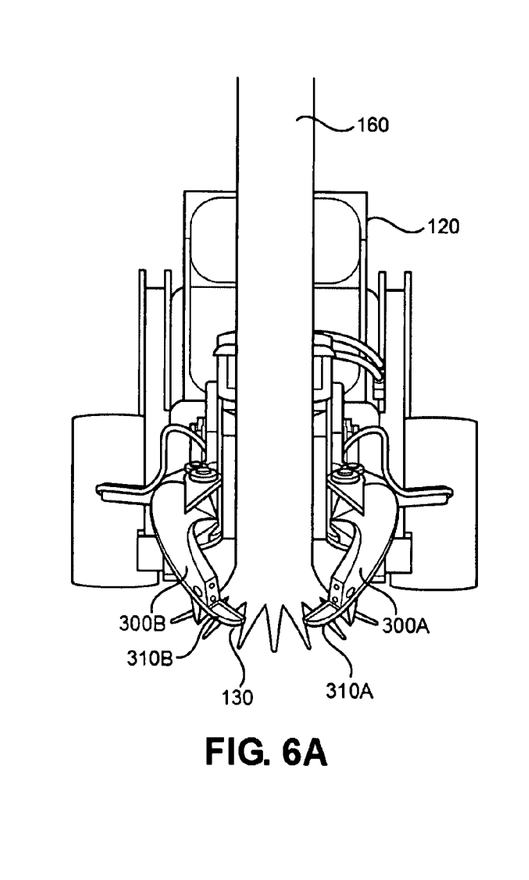
FIG. 6a is a front view of the land-clearing device that shows the unique manner in which the grabbers securely anchor into a root ball.
Figure 6B:
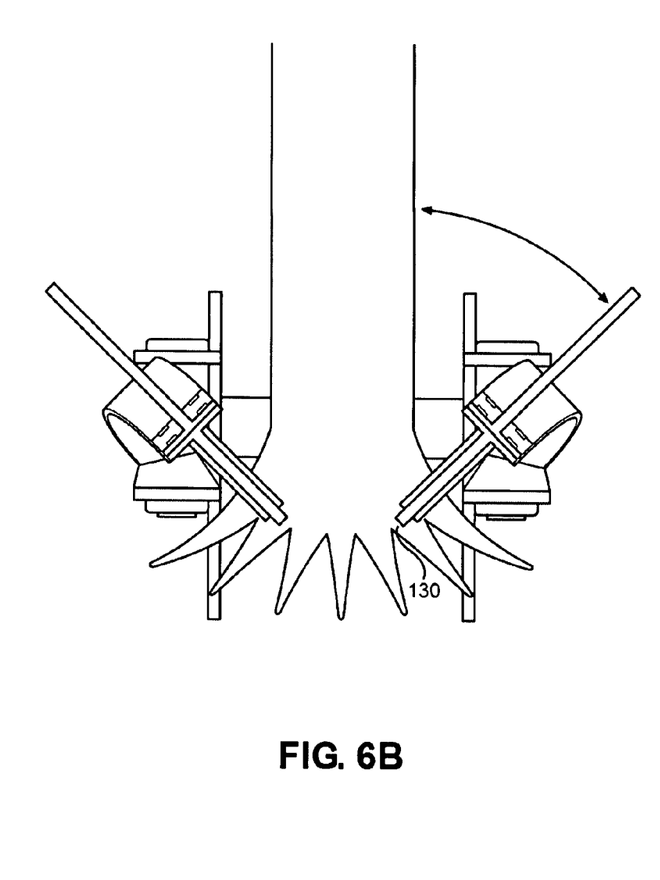
FIG. 6b is a detail view of the land-clearing device that shows the grabber arms uprooting a tree.

FIGS. 6a and 6b illustrate engagement of the tree by the grabber arms 300A and 300B. The C-shaped hooks 310A and 310B securely anchor the land-clearing device 100 into the root ball 130. The drawings illustrate the angular position of the grabber arms 300A and 300B in relation to the vertical extension of the tree 160. In one aspect of the invention, the preferred angle created by the grabber arms 300A and 300B and the vertical axis of the tree 160 is 45 degrees. As the front part 242 of the support cradle 240 and the support bracket 700 rests on the ground, the grabbers can be elevated at their proximate ends and lowered at their distal ends. In this position, the full force tending to uproot the root ball 130 is applied from the hydraulic power source to the hooks 310A and 310B. The loader 120 and the device 100 are stabilized since the grabber arms 300A and 300B act is unison and apply equal force on opposite sides of the root ball.

To operate the land-clearing device 100, the mount assembly 400 is used to attach the land-clearing device 100 to the loader machine 120. The land-clearing device 100 can also be permanently mounted to the loader 120. The mount assembly 400 is tilted towards the loader 120 to lessen the weight of the land-clearing device 100 by bringing the land-clearing device 100 closer to the loader 120 while retracting the grabber arms 300A and 300B back with the side pistons 600A and 600B respectively. This will shorten the total length of the loader 120 with the attached land-clearing device 100 so that the loader 120 with the attached land-clearing device 100 can easily weave in and around trees.

The loader 120 with the attached land-clearing device 100 is positioned near a trunk 140 of a tree 160. The pusher assembly 200 is extended. The mounting bracket 700 and the front part 242 of the cradle 240 rests on the ground to support the cantilevered pusher assembly 200. First, the grabber arms 300A and 300B are turned outward then forward about 135 degrees. The grabber arms 300a and 300b are then allowed to lower to the desired root grabbing point of the trunk 140. The unique hydraulic routing system 180 allows the grabber arms 300A and 300B to get in position prior to the extension of the pusher assembly 200. The pusher assembly 200 is tilted upward against the tree 160 using the adjustable tilt hydraulics on the loader 120. The pusher assembly 200 is positioned at a point 150 higher along the trunk 140 of the tree 160 for harder wood with thicker diameter trunks, and lower on the tree 160 for smaller and softer trees such as pine.

The pusher assembly 200 is extended using actuator arms 220a and 220b, and the actuator arms 220A and 220B are extended to apply the pushing force to the tree 160. The pushing force is applied until a root ball from the tree 160 becomes visible. This will occur when the tree 160 has been uprooted. At this point, the pusher assembly 200 is further extended to push the root ball off the grabber arms 300A and 300B.

The pushing force can extend up to 100 tons on a tree trunk at a speed of 2.5 inch/sec when the flow is 3200 psi and 30 gallons/min. Thus, the pusher assembly 200 would be able to uproot a 24-inch diameter tree. For larger tees, the grabber arms 300A and 300B and C-shaped hooks 310A and 310B respectively can dig around the base of the tree at different angles to loosen and weaken the base of the tree.

The machine 120 with this land-clearing device 100 weighs a fraction of the weight of an excavator or bulldozer.

The compact land clearing device 100 in its retracted position does not substantially increase the physical dimensions of the land clearing equipment, which makes it particularly attractive for wooded areas, where the loader 120 must weave in and around the trees. Leaving as many trees on building lots has become very popular. The prior building of housing developments by clear-cutting whole tracts of land is becoming unpopular. Thus, the land-clearing device 100 of the present invention can assist builders of new homes.

The tree service industry can utilize the land clearing device 100 of the present invention, particularly when running into the problem of a tree that needs to be removed, while the tree is leaning towards a house or power line. This is traditionally achieved by time consuming, expensive, and dangerous tree climbing. The vehicle-mounted land-clearing device 100 could be placed between the structure and the tree, and the pusher assembly 200 would then push the leaning tree away from the structure until it uproots.

Trees that are located in a swampy area where heavy machinery would get stuck pose another obstacle. The Posi-Trac skid-steer loader has a wide rubber track that only exerts 154 psi of ground force. The skid-steer loader has the universal bob-tack attachment mount. The small weight of the loader and the land-clearing device 100 would enable land clearing in the swamp.

In one of the preferred embodiments, the parts of the land-clearing device 100 would be made mostly of one inch steel plate. The three pins through the pin receiving holes have clearance to allow free movement with grease. There are simple caps to keep the pins in place. Additionally, bolts fasten the caps through the center of the ends of the main pivot rod 500. The parts of components of the pusher assembly 200, the grabber arms 300A and 300B, and the mounting assembly 400 can be welded for perfect alignment.

An economy version has also been contemplated that would be smaller, lighter, and half of the expense. The legs on component 200 would be eliminated and there would be one solid piece. Also, there would be no hydraulics or hoses. Thus, the elimination of these parts would reduce the cost of the economy version.

It is envisioned that the land-clearing device of this invention would be beneficial to the logging industry. Typically, trees are cut and stumps are left in the ground. Loggers who harvest pulpwood for the paper industry would be able to harvest the stump to get approximately ten percent more pulpwood. In addition, the work area would be free of stumps for easier and safer movement of the logs and equipment.

It is to be understood that the present invention is not limited to the embodiment described above, but encompasses any and all embodiments within the scope of the following claims.

I claim:

1. A land clearing device, comprising:
   a pusher assembly having telescopically extendable actuator arms and a forward end configured to apply a pushing force to a trunk of a tree, said pusher assembly being supported by a support assembly configured to rest on the ground during operation of the land clearing device and being configured to support cantilevered pusher assembly;
   a grabber assembly mounted below the pusher assembly, said grabber assembly having a pair of generally C-shaped opposing grabber arms configured to partially encircle the trunk of the tree and support the tree at a location opposite a place of contact of the forward end of the pusher assembly;
   a cradle assembly operationally connected to the pusher assembly and the grabber arms, a forward part of the cradle assembly being configured to rest on the ground during operation; and
   a mounting assembly configured for detachable mounting on a front of an earthmoving machine, said mounting assembly being operationally connected to the pusher assembly and the grabber assembly by a common pivot rod.

2. The device of claim 1, further comprising a control unit configured for operating the pusher arms and the grabber arms from interior of the earthmoving machine.

3. The device of claim 1, wherein said pusher assembly comprises a pair of tubular front pusher arms each configured to telescopically receive a slidably movable actuator rod therein.

4. The device of claim 3, wherein said pusher assembly further comprises a generally V-shaped contact member secured to the forward end of the pusher assembly, said contact member being configured to contact the trunk of the tree.

5. The device of claim 1, further comprising a generally U-shaped support bracket operationally connected to the cradle assembly, at least a portion of the support bracket being configured to rest on the ground and stabilize position of the forward part of the cradle assembly.

6. The device of claim 1, wherein each of grabber arms is pivotally secured to the cradle assembly.

7. A land clearing device, comprising:
   a pusher assembly having telescopically extendable actuator arms and a forward end configured to apply a pushing force to a trunk of a tree, said pusher assembly being supported by a support assembly configured to rest on the ground during operation of the land clearing device and being configured to support cantilevered pusher assembly;
   a grabber assembly mounted below the pusher assembly, said grabber assembly having a pair of generally C-shaped opposing grabber arms configured to partially encircle the trunk of the tree and support the tree at a location opposite a place of contact of the forward end of the pusher assembly, wherein each of the grabber arms is provided with a hook on a free end thereof; and
   a mounting assembly configured for detachable mounting on a front of an earthmoving machine, said mounting assembly being operationally connected to the pusher assembly and the grabber assembly by a common pivot rod.

8. The device of claim 7, wherein said hook comprises a pair of arcuate plates retained in a parallel relationship to each other, said plates being attached to a respective grabber arm.

9. A land clearing device, comprising:
   a pusher assembly having telescopically extendable actuator arms and a forward end configured to apply a pushing force to a trunk of a tree, said pusher assembly being supported by a support assembly configured to rest on the ground during operation of the land clearing device and being configured to support cantilevered pusher assembly;
   a grabber assembly mounted below the pusher assembly, said grabber assembly having a pair of generally C-shaped opposing grabber arms configured to partially encircle the trunk of the tree and support the tree at a location opposite a place of contact of the forward end of the pusher assembly, each of said grabber arms being provided with a hook on a forward end thereof;

a cradle assembly operationally connected to the pusher assembly and the grabber arms, a forward part of the cradle assembly being configured to rest on the ground during operation;

a mounting assembly configured for detachable mounting on a front of an earthmoving machine, said mounting assembly being operationally connected to the pusher assembly and the grabber assembly by a common pivot rod; and a control unit configured for operating the pusher arms and the grabber arms from interior of the earthmoving machine.

10. The device of claim 9, further comprising a generally U-shaped support bracket operationally connected to the cradle assembly, at least a portion of the support bracket being configured to rest on the ground and stabilize position of the forward part of the cradle assembly.

11. The device of claim 9, wherein each of grabber arms is pivotally secured to the cradle assembly.

12. The device of claim 9, wherein said pusher assembly comprises a pair of tubular front pusher arms each configured to telescopically receive a slidably movable actuator rod therein.

13. The device of claim 9, wherein said pusher assembly further comprises a generally V-shaped contact member secured to the forward end of the pusher assembly, said contact member being configured to contact the trunk of the tree.

14. The device of claim 9, wherein said hook comprises a pair of arcuate plates retained in a parallel relationship to each other, said plates being attached to a respective grabber arm.

* * * * *